US012642737B2

(12) United States Patent
Wang

(10) Patent No.: US 12,642,737 B2
(45) Date of Patent: Jun. 2, 2026

(54) MASSAGE BEAD, A PAIR OF SHOES AND CUSHION

(71) Applicant: Haibin Wang, Shanghai (CN)

(72) Inventor: Haibin Wang, Shanghai (CN)

( * ) Notice: Subject to any disclaimer, the term of this patent is extended or adjusted under 35 U.S.C. 154(b) by 624 days.

(21) Appl. No.: 18/307,616

(22) Filed: Apr. 26, 2023

(65) Prior Publication Data

US 2023/0255851 A1 Aug. 17, 2023

Related U.S. Application Data

(63) Continuation of application No. PCT/CN2021/141305, filed on Dec. 24, 2021.

(30) Foreign Application Priority Data

Dec. 25, 2020 (CN) ........................ 202011561330.X
Dec. 25, 2020 (CN) ........................ 202023177997.8

(Continued)

(51) Int. Cl.
*A61H 15/00* (2006.01)
*A43B 7/1455* (2022.01)

(52) U.S. Cl.
CPC .............. *A61H 15/00* (2013.01); *A43B 7/146* (2013.01); *A61H 2015/0057* (2013.01); *A61H 2201/0134* (2013.01)

(58) Field of Classification Search
CPC .................... A61H 7/001; A61H 15/00; A61H 2015/0057; A61H 2015/0042;

(Continued)

(56) References Cited

U.S. PATENT DOCUMENTS 6,234,987 B1 * 5/2001 Chen ...................... A61H 23/02 36/141
8,128,583 B2 * 3/2012 Ghatge .................. A61H 15/00 601/134

(Continued)

FOREIGN PATENT DOCUMENTS

CN 202085825 U 12/2011
CN 202774380 U 3/2013

(Continued)

OTHER PUBLICATIONS

A First Search Report in corresponding CN Application No. 202011561330X and its English translation are attached, 6 pages.

(Continued)

*Primary Examiner* — Timothy A Stanis
*Assistant Examiner* — Douglas Y Sul
(74) *Attorney, Agent, or Firm* — MUNCY, GEISSLER, OLDS & LOWE, P.C.

(57) ABSTRACT

A massage bead includes a massage body and at least two sets of extension twisting spring assemblies (ETSAs) arranged below the massage body, each set of ETSAs including a twisting spring and an extension spring. An upper extension twisting arm of the extension spring is connected with the massage body. A lower extension twisting arm of the extension spring is connected with one upper of the twisting spring. The upper extension twisting arm and the extension spring that are arranged in a counterclockwise direction simultaneously relative to the massage body. When the massage body is under pressure, the ETSA is compressed and twisted to generate a rotational pushing force together for pushing the massage body to rotate in the clockwise (Continued)

direction or in the counterclockwise direction, and the pressure disappears so that the massage body and the ETSAs resets automatically when the energy is released.

9 Claims, 11 Drawing Sheets

(30) Foreign Application Priority Data

Dec. 22, 2021 (CN) ......................... 202111580367.1
Dec. 22, 2021 (CN) ......................... 202123246461.1

(58) Field of Classification Search
CPC ............ A61H 39/04; A61H 2201/0134; A61H 2201/149; A61H 2201/1253; A61H 2201/1261; A61H 2201/1269; A61H 2201/1284; A61H 2201/164; A61H 2201/1666; A61H 2201/1676; A61H 2201/1671; A61H 2205/12; A43B 3/42; A43B 7/146; Y01S 5/944; A47C 23/05; A47C 27/07; A33H 33/00; A33H 37/005; A63B 21/023; A63B 21/025
See application file for complete search history.

(56) References Cited

U.S. PATENT DOCUMENTS

| | | | | |
|---|---|---|---|---|
| 11,452,330 | B1 * | 9/2022 | Nasibyan | A61H 15/00 |
| 2008/0010868 | A1 * | 1/2008 | Tsai | A43B 13/182 36/141 |
| 2013/0183086 | A1 * | 7/2013 | Wang | F16B 5/0642 403/327 |
| 2016/0256349 | A1 * | 9/2016 | Mayer | A43B 17/04 |
| 2020/0352274 | A1 * | 11/2020 | Naiker | A61H 23/02 |

FOREIGN PATENT DOCUMENTS

| | | | |
|---|---|---|---|
| CN | 204562831 | U | 8/2015 |
| CN | 206978904 | U | 2/2018 |
| CN | 207784416 | U | 8/2018 |
| CN | 208048517 | U | 11/2018 |
| CN | 112587395 | A | 4/2021 |

OTHER PUBLICATIONS

A Supplementary Search Report in corresponding CN Application No. 202011561330X and its English translation are attached, 5 pages.

* cited by examiner

MASSAGE BEAD, A PAIR OF SHOES AND CUSHION

CROSS REFERENCE TO RELATED APPLICATIONS

This application is a Bypass Continuation of co-pending International Application No. PCT/CN2021/141305, filed on Dec. 24, 2021, for which priority is claimed under 35 U.S.C. § 120; and this application claims priority of Application No. 202011561330.X filed in China on Dec. 25, 2020, Application No. 202023177997.8 filed in China on Dec. 25, 2020, Application No. 202111580367.1 filed in China on Dec. 22, 2021, and Application No. 202123246461.1 filed in China on Dec. 22, 2021, under 35 U.S.C. § 119; the entire contents of all of which are hereby incorporated by reference.

BACKGROUND OF THE INVENTION

Field of the Invention

The invention relates to the technical field of massage, in particular, to a massage bead, and a pair of shoes and a cushion using the same.

Description of the Prior Art

With the continuous development and progress of the economy, living standards are getting higher and higher, and correspondingly, the pursuit of health is becoming more and more intense. As a small massage device, especially a massage device that can be packed into insoles and shoe soles, it can satisfy people's needs for massaging while walking to a large extent.

Similar massage devices, such as more forms of massage shoes, have occurred at present. For example, the utility model CN200520026389.3 discloses a pair of slippers for massaging foot soles. The massage mechanism in the slippers adopts a foot sole massaging column, the foot sole massaging column is mounted on a spring, and the massage effect is realized by pressing the spring. However, this massaging method can only achieve vertical pressing relative to the sole, and cannot rotate at a large angle on the plane of the sole.

The utility model CN201220446441.0 discloses a rotary massage slipper, wherein helical grooves are formed on the side surface of each base, limiting projections are formed on the outer side surface of each massage key body, and the projections snap into the grooves, so that the massage key body can rotationally move up and down along the grooves. Similarly, for example, the CLORIS™ massage slipper currently on the market has a sole provided with rotatable massage buttons; wherein for the main structure of the massage buttons, refer to the schematic diagram shown in FIG. 1. Under the action of pressing down on the foot sole, through the cooperation of the projection 12 on the button 11 and the inclined sliding groove 14 embedded on the button sleeve 13 outside the button, the projection 12 slides obliquely in the sliding groove when the button 11 moves downward, so that the upper end face of the button further realizes the rotation on the horizontal plane while the button moving downward. However, in this type of massage device that realizes rotation through the sliding groove, limited by the diameter of the button or massage body (set on the sole and the size cannot be too large), the angle of the sliding grove is limited, resulting in only a small angle of rotation on the horizontal plane, which can only be rotated about 10 degrees. The rotation angle is the ratio of the projection of the sliding groove on the bottom plane to the entire bottom plane. If the angle of the sliding groove is too large, problems such as stagnation and poor structural stability may be caused. Further, limited by height, the length of the sliding groove is also limited. Due to the small rotation angle, the functionality is relatively poor. Due to the sliding structure, the frictional force is relatively large, and long-term use is easy to wear the projections and inclined grooves, resulting in degradation or failure of the rotation function.

SUMMARY OF THE INVENTION

The technical problem to be solved by the invention is to provide a massage bead, a pair of shoes and a cushion, so as to solve the problems that the existing small massage structure may not realize foot massage during walking, and the horizontal rotation angle is small, the massage effect is poor, the elasticity is weak, and the toughness is low.

In order to solve the above problems, the invention uses the following technical solutions:

A massage bead of the invention includes a massage body, below which at least two sets of extension twisting spring assemblies (ETSAs) are arranged, wherein the massage body is mounted on an external supporting member through the ETSA;

- each set of the ETSAs includes a twisting spring and an extension spring; the ETSA is located below the massage body and mounted on the external supporting member through the twisting spring, an upper extension twisting arm of the extension spring is connected with the massage body, and a lower extension twisting arm of the extension spring is connected with one upper of the twisting spring; the upper extension twisting arm, the extension spring and the lower extension twisting arm that are connected with each other are arranged in a tilted manner and in a clockwise direction or in a counterclockwise direction simultaneously relative to the massage body;
- when the massage body is under pressure, the ETSA is compressed and twisted to generate a rotational pushing force together for pushing the massage body to rotate in the clockwise direction or in the counterclockwise direction simultaneously, and deformation energy is stored when the ETSA is compressed and twisted.

Preferably, two sets or more than two sets of the ETSAs are arranged uniformly in a circumferential direction around a center of the massage body;

- preferably, the twisting spring is arranged radially below the massage body, or below the massage body arbitrarily;
- the upper end of the twisting spring is connected with the arbitrary shaped extension spring, and the lower end of the twisting spring is further provided with arbitrary shaped extension arm, each of the extension arms of the ETSAs being connected with each other arbitrarily.

Preferably, the upper extension twisting arm, the extension spring and the lower extension twisting arm of any shapes that are connected with each other are arranged axially and in a tilted manner relative to an axial direction of the massage body.

Preferably, the massage body includes a massage base and a massage structure, and the massage base and the massage structure are two independent structures or the massage base is integrated with the massage structure.

Preferably, the massage body includes a massage structure and a massage base, and the massage structure is arranged on an upper end surface of the massage base. An inner side or an outer side of the massage body or the massage base is provided with a mounting hole, and an end of the upper extension twisting arm is inserted with, snapped with or welded with or connected with the mounting hole in an arbitrarily combined manner;

the upper extension twisting arm is fixedly connected or/and non-fixedly connected with the massage base.

Preferably, the inner side or the outer side of the massage body is provided with an earring hole, and the end of the upper extension twisting arm is snapped with or connected with the earring hole arbitrarily or connected to the massage base.

Preferably, a receiving portion corresponding to each of the ETSAs and the massage body is arranged on the external supporting member, so that when the massage body is rotated and pressed downward or pressed completely under a force, the massage bead may be placed in the receiving portion.

Preferably, the massage body includes a massage structure and a massage base; the massage structure is arranged on the upper end surface of the massage base, and the upper extension twisting arm is connected to the inner sides, the outer sides, and any combinations thereof of the massage base.

Preferably, a shape of an end surface of the massage structure opposite to the massage base is a hemisphere, a semi-ellipse, a polyhedron, a figure, a symbol, a character, a letter, or other preset shapes, or one or/and any combinations thereof.

Preferably, materials of the massage structure and the massage base are stone (such as stone, jade, etc.), wood (such as Hainan huanghuali, rosewood, etc.), herbs (incense, asparagus, etc.), composite materials (such as carbon fibre, ceramic, stainless steel, etc.) or synthetic materials (such as plastic, rubber, etc.) and any combinations thereof.

A pair of shoes of the invention includes the massage bead according to any one of the above.

A cushion of the invention includes the massage bead according to any one of the above.

Due to the above technical solutions, the invention has the following advantages and beneficial effects as compared to the prior art:

1. In the invention, through the provision of at least two sets of ETSAs below the massage body, the lower ETSA is compressed and twisted to store the deformation energy and the rotational pushing force generated pushes the massage body to rotate when the massage body is under a downward pressure; when the downward pressure disappears gradually, the ETSA releases the energy, and the massage body moves upward to reset automatically.

In the invention, the ETSA is twisted naturally under the pressure and resets automatically by releasing the energy in a combination of the assembly itself; compared with the massage button in the sliding groove type in the prior art, the massage body in the invention has a larger rotation angle, a firm structure, and a better massage effect, so as to solve the problems that the existing small massage structure may not realize foot massage during walking, and the horizontal rotation angle is small, the massage effect is poor, the elasticity is weak, and the toughness is low; further, the provision of the extension spring may further improve the rotation angle of the massage body, and further improve the massage effect.

2. In the invention, through the provision of the ETSA, the buffer may be realized when there is downward pressure, thereby improving the massage effect.

3. In the invention, an axis where the extension twisting arms on the upper and lower ends of the extension spring are located is served as a first axis; for example, when rotating in the clockwise direction, the extension spring body may be arranged on the outer side and the inner side of the two first axises, or the two first axises pass through and extend along a centerline of the extension spring body (or the two first axises pass through any positions in the extension spring body). The ETSA provides high buffering force when the extension spring body is arranged at the outer side of the two first axises, which is suitable for a heavier user; the ETSA provides low buffering force when the extension spring body is arranged at the inner side of the two first axises, which is suitable for a lighter user; the arrangement that the two first axises pass through the centerline of the extension spring body is suitable for a user with a medium weight. Therefore, the ETSA may be adapted to the weight and needs of the user.

4. In the invention, through the adjustment of the wire diameter, the spacing, the number of turns, the material, the length, the outer diameter and the height of the extension spring and the twisting spring, people of different weights and the unevenness, size, and height of the foot sole may further be matched, and personalized design may be further realized, so that people can enjoy comfortable self-massage and reaction thrust during use, thereby effectively improving the quality of life.

Figure 1:
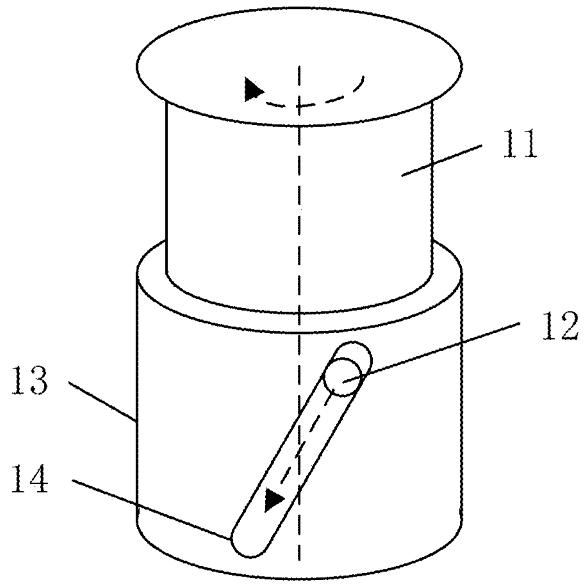
Fig. 1(Prior Art)
FIG. 1 is a structural diagram of a massage button in the prior art.

Descriptions of reference numerals: 11: button; 12: projection; 13: button sleeve; 14: sliding groove; 21: massage structure; 22: massage seat; 23: ETSA; 31: twisting spring; 32: lower extension twisting arm; 33: extension arm; 34: extension spring; 35: upper extension twisting arm; 51: fixing block; 52: external supporting member; 53: trapezoidal slot; 54: massage seat; 81: bump; 91: hole; 101: sole; 102: massage bead; 121: material layer (insole); 521: receiving portion.

DESCRIPTION OF THE PREFERRED EMBODIMENTS

The invention will be described in more detail hereinafter with reference to the accompanying drawings showing embodiments of the invention. However, the invention may be embodied in many different forms and should not be construed as limited to the embodiments set forth herein. Rather, these embodiments are provided so that the disclosure will be thorough and complete, and will fully convey the scope of the invention to those skilled in the art. In the drawings, the size and relative sizes of layers and regions may be exaggerated for clarity.

A massage bead, a pair of shoes and a cusion according to the invention will be further described in combination with drawings and embodiments. The advantages and features of the invention will be apparent from the following description and claims.

Embodiment 1

With reference to FIGS. 2 to 16, the embodiment provides a massage bead including a massage body, at least two sets of ETSAs 23 are arranged below the massage body, and the massage body is mounted on an external supporting member through a twisting spring 31 of the ETSA 23, wherein each set of the ETSAs 23 includes the twisting spring 31 and an extension spring 34; the twisting spring 31 is located below the massage body and mounted on the external supporting member, an upper end of the extension spring 34 is connected with the massage body through an upper extension twisting arm 35, and a lower end of the extension spring is connected with one upper of the twisting spring 31 through a lower extension twisting arm 32; the upper extension twisting arm 35, the extension spring 34 and the lower extension twisting arm 32 in each set that are connected with each other are arranged in a tilted manner and in a clockwise direction or in a counterclockwise direction simultaneously relative to the massage body;

when the massage body is under pressure, the ETSA 23 is compressed and twisted to generate a rotational pushing force together for pushing the massage body to rotate in the clockwise direction or in the counterclockwise direction for realizing massage effect, and deformation energy is stored when the ETSA is compressed and twisted. When the pressure exerted on the massage body disappears gradually, the energy of the ETSA releases gradually, and then the massage body resets automatically.

Figure 2:
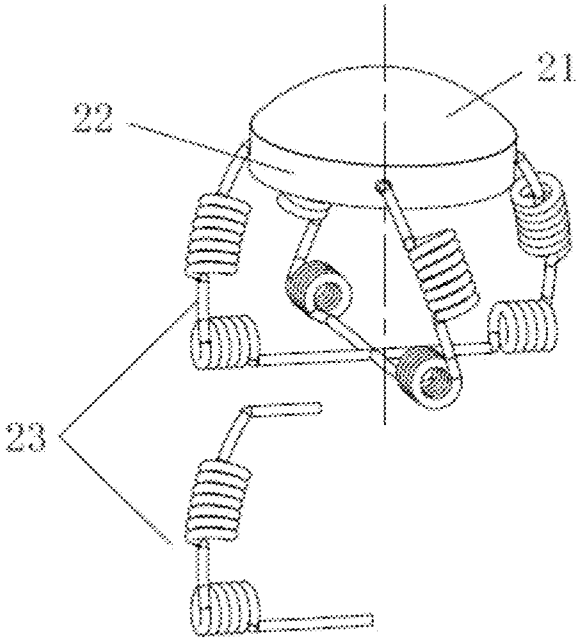
FIG. 2 is a diagram of a massage bead rotating in the clockwise direction according to Embodiment 1 of the invention.

In the embodiment, as shown in FIG. 2, the massage bead includes four sets of twisting spring assemblies 23, and the four sets of twisting spring assemblies 23 are arranged uniformly in a circumferential direction around a center of the massage body so as to facilitate the stable rotation of the massage body. In the embodiment, the provision of four sets of twisting spring assemblies 23 causes a rotation angle of the massage body to be between 44° and 86°, which results in good massage effect. Of course, in other embodiments, the massage bead may also include two or three or five or other sets of twisting spring assemblies 23, wherein the fewer the number of sets, the larger the angle of pushing the massage body to rotate. The specific number of sets of twisting spring assemblies 23 is not limited here, and may be adjusted accordingly according to the requirements such as the rotation angle of the massage body.

Figure 3:
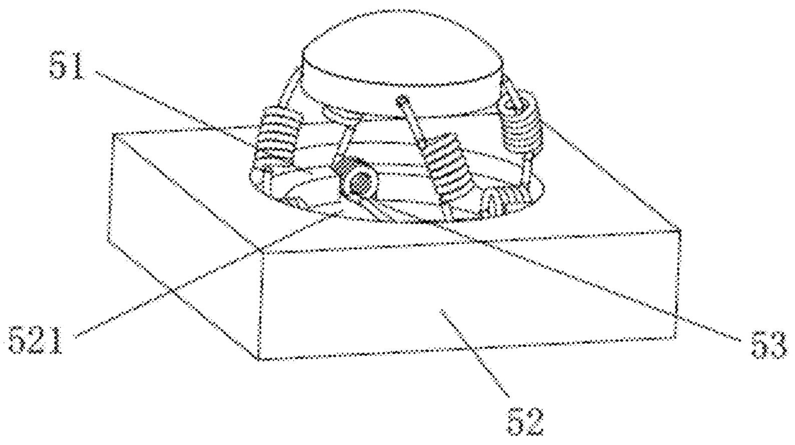
FIG. 3 is a diagram showing that the massage bead rotating in the clockwise direction shown in FIG. 2 is arranged on a base.
Figure 4:
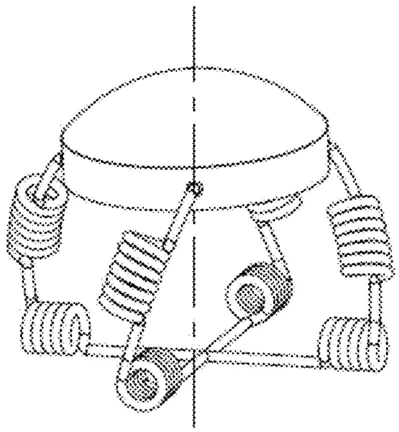
FIG. 4 is a diagram of a massage bead rotating in the counterclockwise direction according to Embodiment 1 of the invention.
Figure 5:
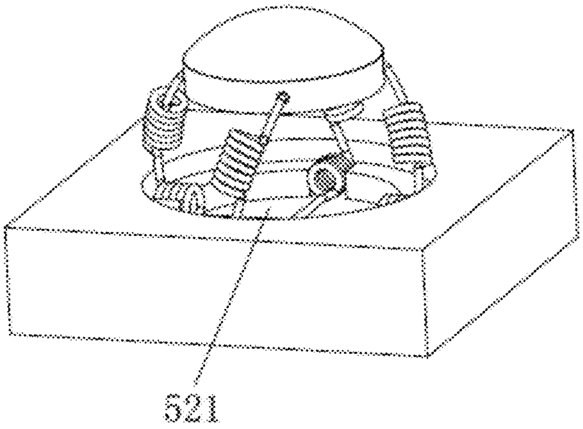
FIG. 5 is a diagram showing that the massage bead rotating in the counterclockwise direction shown in FIG. 4 is arranged on a base.
Figure 6:
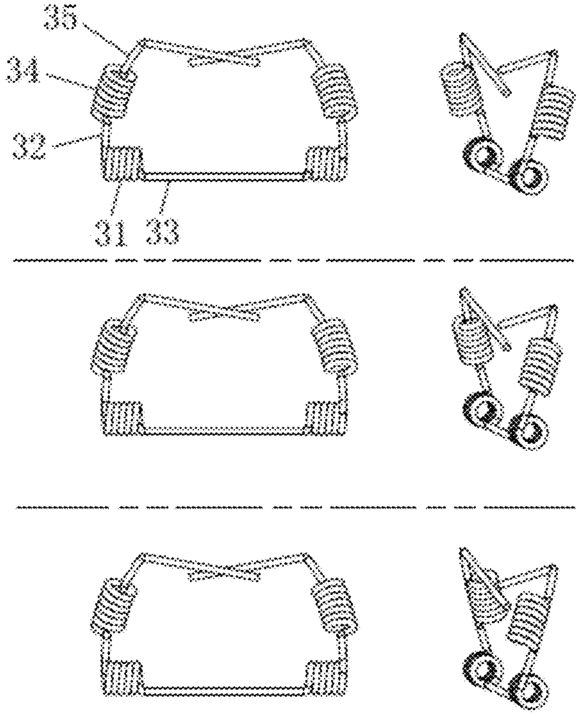
FIG. 6 is a diagram showing three structures of an ETSA arranged in the clockwise direction according to Embodiment 1 of the invention.
Figure 7:
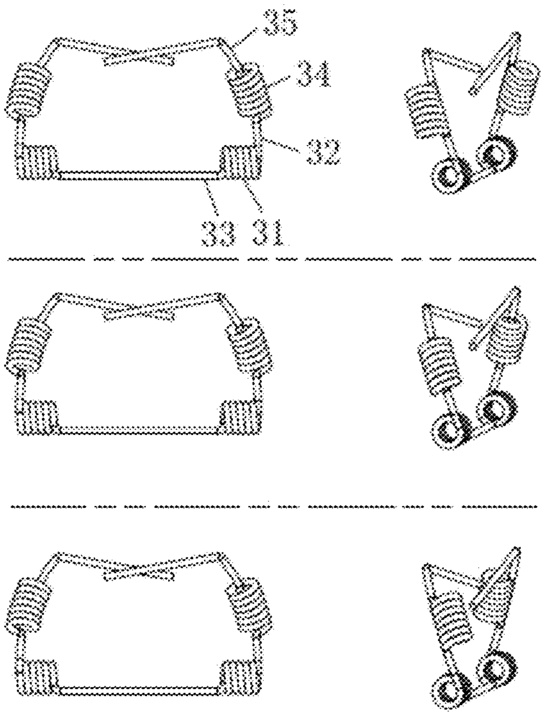
FIG. 7 is a diagram showing three structures of the ETSA arranged in the counterclockwise direction according to Embodiment 1 of the invention.

Four sets of ETSAs 23 are all tilted in the clockwise direction, as shown in FIGS. 2 to 3 and FIG. 7. Or, four sets of ETSAs 23 are all tilted in the counterclockwise direction, as shown in FIGS. 4 to 5 and FIG. 6; four sets of ETSAs 23 are all tilted in the clockwise direction in the same direction, so that when the massage body is under downward pressure, the twisting spring assembly 23 is twisted to push the massage body to rotate in the clockwise direction or in the counterclockwise direction simultaneously.

In the embodiment, the extension spring 34 of each set of twisting spring assemblies 23 is arranged in a tilted manner and in a vertical direction, and the twisting spring 31 is arranged below the massage body in a transverse direction; the upper end of the extension spring 34 is connected with the massage body through the upper extension twisting arm 35, and the lower end thereof is connected with the twisting spring 31 through the lower extension twisting arm 32.

Preferably, the upper extension twisting arm 35, the extension spring 34, and the lower extension twisting arm 32 of each set are tilted at the same angle as a whole in an axial direction relative to the massage body, and a range of the tilted angle is from 4° to 46°, under which the largest rotation angle at which the massage body may be rotated is ensured while ensuring pushing the massage body to rotate, thereby improving the massage effect. Of course, in other embodiments, the specific tilted angle is not limited to the above; the angle may be adjusted according to the height of the massage body of the massage bead in the vertical direction and the rotation angle in the transverse direction, and may also be properly configured according to the actual application field of the massage bead such as the unevenness of the sole, thereby realizing rotational massage at a variety of different angles and directions.

Figure 8:
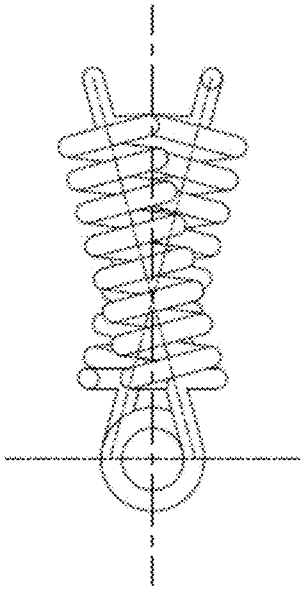
FIG. 8 is a diagram showing that a first axis passes through a centerline of an extension spring body according to Embodiment 1 of the invention.
Figure 9:
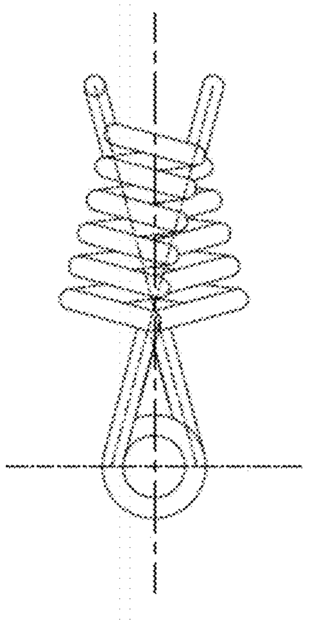
FIG. 9 is a diagram showing that the extension spring body is located at an inner side of the first axis according to Embodiment 1 of the invention.
Figure 10:
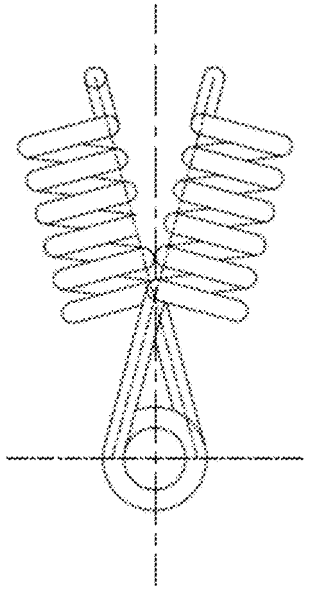
FIG. 10 is a diagram showing that the extension spring body is located at an outer side of the first axis according to Embodiment 1 of the invention.

In the embodiment, the upper extension twisting arm and the lower extension twisting arm of the same set are arranged in a tilted manner at the same angle, i.e., arranged co-axially, and both the positions where the upper extension twisting arm and the lower extension twisting arm are connected to the extension spring are selected according to actual needs. With reference to FIGS. 8 to 10, an axis where two upper extension twisting arms arranged oppositely or the lower extension twisting arm is located is treated as a first axis (two), and the rotation in the clockwise direction is taken as an example, two extension springs may be arranged at outer sides and inner sides of two first axises or two first axises pass through a centerline of the extension spring (or the two first axises pass through any position in the extension spring body).

Specifically, as shown in FIG. 10, the ETSA 23 with the two extension springs arranged at the outer sides of the two first axises has a larger buffer force and a larger twisting angle, which is suitable for a heavier user with a higher requirements on the massage; as shown in FIG. 9, the ETSA 23 with the two extension spring bodies arranged at the inner sides of the two first axises has a smaller buffer force, which is suitable for a lighter user with a smaller twisting angle; as shown in FIG. 8, the ETSA 23 with the two first axises passing through the two extension springs is suitable for a user with a medium weight. Therefore, the wire diameter, spacing, number of turns, material, length, outer diameter, and height of the ETSA may be adapted according to the weight of the user.

In other words, in other embodiments, the upper extension twisting arm 35 and the lower extension twisting arm 32 are arranged in the different axises, i.e., located at the different tilted angles, and then the upper extension twisting arm 35 may slightly shift to the direction to be rotated and horizontally offset a certain angle while inserting into a side surface of the massage base 22 designed according to the angle at which the upper extension twisting arm 35 deviates horizontally; such a design may make the massage beads produce a larger rotation angle to meet the needs of different personalized people.

In the embodiment, the upper extension twisting arm 35 of the extension spring 34 is connected to an outer side of the massage body in a peripheral direction; specifically, the outer side of the massage body is provided with a mounting hole, and an end of the upper extension twisting arm 35 is inserted into the mounting hole for realizing rotational connection. In other words, in other embodiments, the rotational connection between the upper extension twisting arm 35 and the massage body is not limited to the above and may be adjusted according to specific conditions.

In the embodiment, the upper end of the twisting spring 31 is connected with the arbitrary shaped extension spring 34, and lower end of the twisting spring 31 is further provided with arbitrary shaped extension arm 33, each of the extension arms 33 of the ETSAs 23 being connected with each other arbitrarily.

Figure 12:
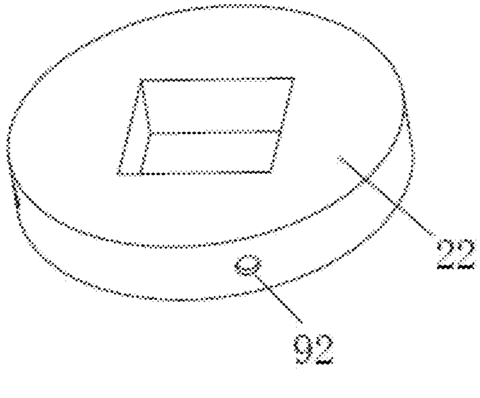
FIG. 12 is a three dimensional diagram of a massage base of the massage bead according to a preferred embodiment of Embodiment 1 of the invention.

Further, an edge of the mounting hole is provided with an arc 92, as shown in FIG. 12, and this design may prevent the upper extension twisting arm 35 from wearing at right angles to the massage body.

In the embodiment, a spacing is left between the spring coils of the extension spring 34, and the wire diameter, spacing, number of turns, material, length, outer diameter, and height of the extension spring 34 and the twisting spring 31 may be adjusted according to the body weight and the unevenness of the foot sole. Through the adjustment of the material, the number of turns, the wire diameter, the spacing of coils, the elasticity, and the height of the twisting spring 31, people of different weights and the unevenness, size, and height of the foot sole may further be matched, and personalized design may be further realized, so that the user may enjoy comfortable self-massage and reaction thrust during use, thereby greatly improving the quality of life.

In the embodiment, the twisting spring 31 of each set is mounted to the external supporting member 52 horizontally, and specifically, the axial direction of the twisting spring 31 is slightly parallel to the bottom of the massage body and is arranged along a radial direction of the massage body.

Further, an extension arm 33 may be extended and connected between the twisting springs 31 respectively, and each of the extension arms 33 of the ETSAs have one end connected with the twisting spring 31 and the other ends connected with each other, thereby ensuring a relative stability among the four sets of extension twisting assemblies and the massage beads. Specifically, in the embodiment, the two twisting springs 31 arranged oppositely are connected with each other through one of the extension arms 33 respectively, the four twisting springs 31 are connected in pairs by two of the extension arms 33, and the two extension arms 33 are arranged at 90° in a cross, and the intersections are fixedly connected to each other. In other words, in other embodiments, the connection mode between the twisting springs 31 is not limited to the above and may be adjusted arbitrarily according to specific conditions.

In the embodiment, preferably, the upper extension twisting arm 35, the extension spring 34, the lower extension twisting arm 32, the twisting spring 31, and the extension 33 included in each set of corresponding twisting spring assemblies 23 are integrally formed, i.e., the two sets of corresponding twisting spring assemblies 23 share an extension arm so as to further be integrally formed, wherein being integrally formed may ensure that the ETSA 23 formed in combination is stronger.

Further, the material of the ETSA 23 may be configured as metal, alloy material, or other synthetic or composite material with good toughness, elasticity, and supporting force. The rotation of the massage beads is realized by the repeated twisting of the ETSA 23 and the reset of the twisting spring 31. Those skilled in the art can freely set parameters such as the material, size, wire diameter, and length of the ETSA 23 according to the needs of the application field of the massage bead, which are all included in the scope of the embodiment.

In the embodiment, the massage beads are fixedly mounted by mounting the twisting spring 31 on the external supporting member 52; the external supporting member 52 may be a base, and then the base is mounted to the supporting members such as the sole; the external supporting member 52 may also be integrally formed directly with supporting members such as soles, insoles, mats, etc., which is not limited here.

Specifically, as shown in FIG. 3, a position where the external supporting member 52 corresponds to the twisting spring 31 is provided with a trapezoidal slot 53 for receiving each of the twisting springs 31 and the extension arms 33, and a fixing block 51 is further provided between adjacent twisting springs 31, so that the trapezoidal slot 53 formed between adjacent fixing blocks 51 is used to fix the twisting spring 31 and prevent the twisting spring from moving; preferably, the size of the trapezoidal slot 53 is slightly smaller than that of the twisting spring 31 so as to compress the twisting spring 31, and the bottom of the external supporting member 52 may also be provided with a slot so as to insert the extension arm of the twisting spring 31 therein.

In other words, in other preferred embodiments, the connection mode between the twisting spring 31 and the external supporting member 52 is not limited to the above, i.e., the fixing block 51 may also be replaced with other structures such as a porous block, a hollow block, etc. arranged on the supporting member, wherein the porous block and the hollow block may reduce weight with the identical effect of the fixing block 51, or the fixed connection with the supporting member is performed by plugging, mortise and tenon, buckle, glue or fastening device, so as to play the role of fixing the twisting spring 31 (or the fixing block, the porous block, the hollow block, and the supporting member are integrally formed) with the working process that will not be repeated here.

Figure 11:
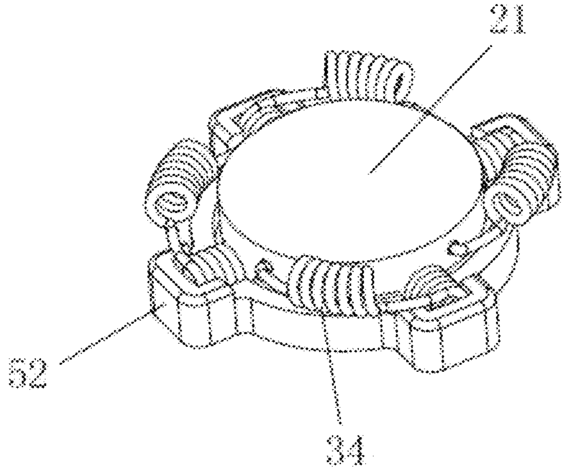
FIG. 11 is a diagram showing a situation after the massage body is pressed completely according to Embodiment 1 of the invention.

In the embodiment, a position of the external supporting member corresponding to the massage bead is provided with a receiving portion 521; when the massage body is forced to be rotated and pressed downward completely, the ETSA 23 may be received in the receiving portion for preventing the ETSA 23 from interfering with the external supporting member, so as to ensure the normal rotation of the massage body. Further, the receiving porting may be implemented as a notch provided on the external supporting member, as shown in FIG. 11; in other words, in other embodiments, the implementation of the receiving portion is not limited to the above and may also be adjusted according to specific conditions.

In the embodiment, the massage body includes a massage base 22 and a massage structure 21, wherein the massage structure is arranged on an upper end surface of the massage base, and the upper extension twisting arm 35 is connected to the massage base 22. In other words, in other embodiments, the upper extension twisting arm 35 may also be connected to the massage base 22 and connected to the massage structure 21 in any combination. Or, the massage base 22 may also be integrally formed with the massage structure 21 as an integral structure, and the upper extension twisting arm 35 may be directly connected to the massage body, which will not be repeated here and may be selected according to actual needs.

Figure 13:
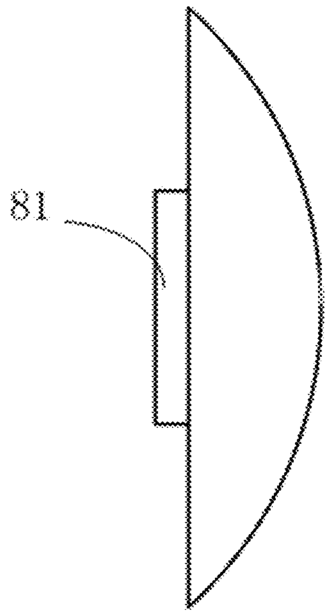
FIG. 13 is a side diagram of a massage structure of the massage bead according to a preferred embodiment of Embodiment 1 of the invention.

In the embodiment, as shown in FIG. 13, an upper portion of the massage structure 21 may be configured as a smooth hemispherical convex structure. When the massage structure 21 is under pressure to be rotated under the operation of the entire massage bead, the smooth hemispherical convex structure rotates and acts on the object to be massaged, providing a gentle rotational massage. In other preferred embodiments, the upper portion of the massage structure 21 may also be configured as a semi-elliptical spherical body, or the upper portion of the massage structure 21 may also be configured as a combination structure of a plurality of grooves and/or raised semicircular or semi-elliptical convex surfaces with preset patterns, such as arranging raised points, cross raised patterns or other forms of raised pattern structures on convex structures. The surface of the massage structure 21 may also be provided with grooves of various patterns, or protrusions and grooves may be provided at the same time. The provision of the protrusion and/or the groove structure may further improve the massage effect and improve the massage experience. In other words, the upper portion of the massage structure 21 may also be configured as a rough semicircular or semi-elliptical convex composite structure. Those skilled in the art may freely configure the surface structure of the massage structure 21 according to the actual needs of the application field of massage beads, which are all included in the scope of the embodiment.

Figure 15:
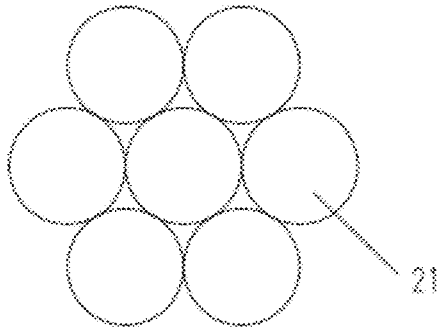
FIG. 15 is a top diagram of the massage structure of the massage bead according to another preferred embodiment of Embodiment 1 of the invention.
Figure 16:
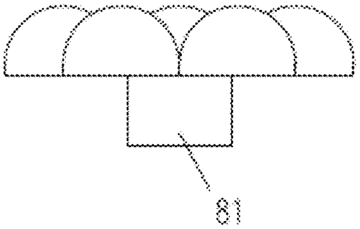
FIG. 16 is a side diagram of the massage base of the massage bead according to another preferred embodiment of Embodiment 1 of the invention.

In other embodiments, with reference to FIGS. 15 and 16, the massage structure may be a plurality of small hemispheres, which is beneficial to the large-angle rotation of the massage beads, and provides a multi-point rotational massage experience. The small hemispherical massage structure 21 may be integrally formed and arranged on the massage base, or integrally formed with the massage base to form a multi-spherical massage body, wherein the spheres may be any combination of hemispheroids and/or semi-elliptical spheres, and the spheres may be evenly distributed or irregularly distributed, which may further improve the massage effect and improve the massage experience.

In the embodiment, the massage base 22 is connected with the massage structure 21 by connecting members.

Figure 14:
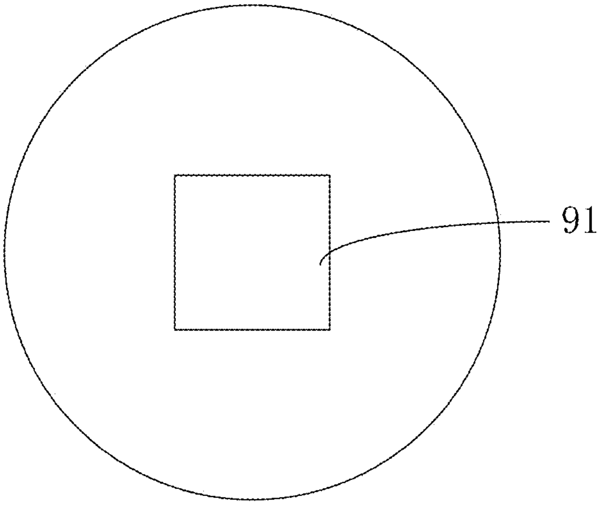
FIG. 14 is a cross-sectional diagram of the massage base of the massage bead according to a preferred embodiment of Embodiment 1 of the invention.

Specifically, with reference to FIGS. 13 to 14, a lower portion of the massage structure 21 is provided with a first connecting member, and the massage base 22 is provided with a second connecting member correspondingly. The massage structure 21 is connected with the second connecting member of the massage base 22 by the first connecting member, wherein the first connecting member and the second connecting member may be connected in any combination of plug-in, mortise, and tenon, and matching methods of projections and grooves.

Further, in the embodiment, the first connecting member on the lower portion of the massage structure 21 is a bump 81, and correspondingly, the second connecting member on the massage base 22 is a matching hole 91, so that the massage structure 21 is fixedly connected to the massage base 22 by inserting the bump 81 into the hole 91 and the auxiliary fixing of the socket, mortise and tenon and environmental glue. In the embodiment, cross-sectional shapes of the bump 81 and the hole 91 are squares, which is used to prevent mutual rotation. In other words, in other embodiments, the cross-sectional shape of the bump 81 and the hole 91 may also be other polygons or other regular or irregular shapes, which are not limited here and may be adjusted according to specific conditions.

Further, in the embodiment, the massage base 22 is a disc structure with the hole 91, and the structure is round on the outside and square on the inside, which is similar to ancient coins; a side of the massage structure 21 provided with the bump 81 is a planar structure. When the massage structure 21 is mounted and fixed with the massage base 22 by the bump 81 and the hole 91, the sides where the two are connected are flat to achieve a flat fit, improving the structural stability of the two after mounting and fitting. In other words, in other embodiments, the hole 91 may also not pass through the massage base 22, which is not limited here.

The connection mode between the massage base 22 and the massage structure 21 is not limited to the above description; for example, the first connecting member may also be a hollow structure, and the second connecting member is a bump structure; for example, the number of the first connecting member and the second connecting member may also be multiple; and for example, the provisions of the first connecting member and the second connecting member may be omitted, and the massage base 22 and the massage structure 21 are directly fixed with each other by glue as long as the fixing between the two can be realized, which is not limited here.

Preferably, materials of the massage structure 21 are stone needles or other stone, wood, medicinal material, pure material, composite, or synthetic material, and any combinations thereof, which may be selected according to actual needs and is not limited here.

When the material of the massage structure 21 is the stone, the stone may be jade, magnetite, germanium, diamond longevity stone or diamond medicine stone, tourmaline, obsidian, garnet, malachite, peridot, citrine, maifan stone, or medical stone.

The material of the massage structure 21 is the stone needle, which is originated from “Insufficient of Shen (Spirit), the weak Collaterals are pressed to enrich [Qi].” in On Regulating Meridians, Chapter 62, General Questions and Answers From Huange Di’s Inner Classic. Section 12 of Discussion on Different Therapeutic Methods for Different Diseases (Ylfa Fangyi Lunpian) of Yellow Emperor’s Canon of Medicine Plain Conversation (Huangdi Neijing Suwen) says: “For example, the east is the place where all the things in nature start to grow. The east is near the sea and is rich in fish and salt. People there prefer fish and salty taste. They live in satisfaction and enjoy rich food. But excessive fish food tends to accumulate heat in the body and excessive salty flavor is likely to impair blood. That is why people there look block in skin and are loose in muscular interstices. They frequently suffer from Yong (carbuncle) and Yang (ulcer) that can be cured by stone-needle. In fact, the stone-needle was developed in the east.” Therefore, the selection of the stone needle for the material of the massage body only brings some additional effects, and does not affect the integrity of the technical solution of the application.

Arranging the stone needle on the massage seat as the massage structure 21, in combination of the ETSA 23, may control the rotation of the stone needle at a precise angle when being under pressure with a rotation angle greater than the normal massage button, thereby realizing good massage experience. The massage bead effectively solves the problem that the massage with existing stone needles may only perform large-angle rotational massage manually and may not realize foot massage during walking. The massage bead provided in the embodiment achieves good effects of light weight, flexible rotation, and connection between the preceding and the following, and are more practical when used on other carriers.

The purpose of material selection is to better achieve the effect of foot massage. The above-mentioned different types of massage structures 21 may be rotated precisely at a large angle when receiving pressure through the cooperation of the ETSA 23 of the massage bead and the massage seat 22, and in combination of different materials of the massage structures 21, the massage effect is improved so as to provide a better massage experience to the user.

In the embodiment, the material of the massage seat 22 is carbon fiber, pure material, composite material or synthetic material, etc., which are not limited here and may be selected according to specific conditions.

When the material of the massage seat 22 is carbon fiber, this material is light in texture, stable in structure, high temperature resistant, friction-resistant, and corrosion-resistant and makes the overall structure lighter when being used in the massage bead structure; when the massage bead is applied on different carriers, the weight of the overall structure may be effectively reduced, and the number of massage beads may be adjusted to improve the massage experience. Since the massage seat 22 is made of wear-resistant carbon fiber material, the additional wear and tear will be less when the massage bead is used repeatedly.

In summary, the massage bead provided in the embodiment may realize large-scale rotation under the action of its own pressure, and automatically reset when the pressure decreases or disappears. Through the combination of the ETSA and the massage seat 22, large-angle massage without relying on manual work may be realized, so that the friction loss is smaller as compared with other existing massage structures, making the massage bead of the embodiment more durable.

The different sizes, wire diameters, number of turns, quantity and material settings of the ETSA 23 may be flexibly changed to meet various demands. According to different situations such as the weight of the human body and the unevenness of the foot sole, different ETSAs 23 may be designed to make the massage experience more comfortable.

The massage bead has a simple structure and light weight, and are suitable for massage applications in various scenarios. When the massage bead is applied on different carriers (such as a pair of shoes, insoles, etc.), the application range and massage experience will be more abundant. The massage bead may provide the user with more comprehensive, balanced and comfortable massage effects in different scenarios.

Embodiment 2

Figure 17:
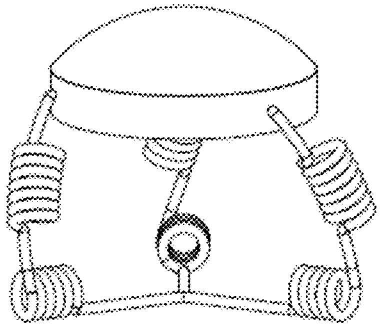
FIG. 17 is a diagram of a massage bead rotating in the clockwise direction according to Embodiment 2 of the invention.
Figure 18:
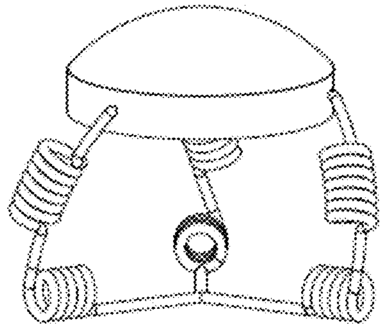
FIG. 18 is a diagram of a massage bead rotating in the counterclockwise direction according to Embodiment 2 of the invention.

With reference to FIGS. 17 to 18, the embodiment is an adjustment based on Embodiment 1.

Specifically, in the embodiment, the massage bead includes three sets of twisting spring assemblies 23, and the three sets of twisting spring assemblies 23 are arranged uniformly in a circumferential direction around a center of the massage body. The three twisting springs 31 are respectively extended with an extension arm 33, and each set of ETSAs 23 is integrally formed; three extension arms 33 are arranged at intervals of 120°, and one end of the extension arms 33 are connected to the twisting springs 31, and the other ends thereof are connected to each other, which may be connected by any means such as pressing, hot melting, hook welding or/and glue.

In the embodiment, for other structures of the massage bead, reference can be made to the description in Embodiment 1, which is not limited here.

The massage bead provided in the embodiment is only provided with three sets of twisting spring assemblies 23, which causes the rotation angle of the massage body to reach from 94° to 116°, has a larger rotation angle and a better massage effect as compared with the four sets of twisting spring assemblies 23 in the embodiment.

Embodiment 3

The embodiment is an adjustment based on Embodiment 2.

Figure 19:
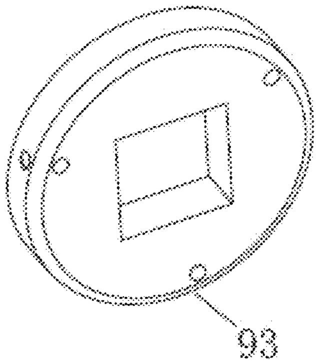
FIG. 19 is a three dimensional diagram of a massage base of the massage bead according to a preferred embodiment of Embodiment 3 of the invention.
Figure 20:
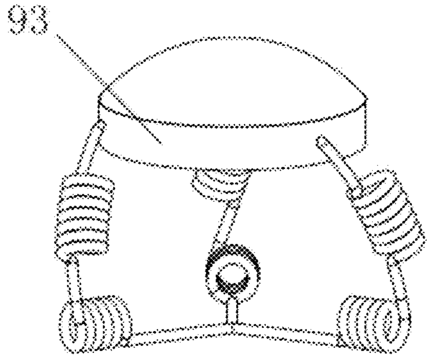
FIG. 20 is a diagram of the massage bead according to Embodiment 3 of the invention.

With reference to FIGS. 19 to 20, in the embodiment, the outer side of the massage body is provided with an earring hole 93 (an edge of the earring hole is still provided with the arc), and the end of the upper extension twisting arm is connected with the earring hole 93 in a buckle manner.

In the embodiment, for other structures of the massage bead, reference can be made to the description in Embodiment 2, which is not limited here.

Embodiment 4

The embodiment is an adjustment based on Embodiment 1.

Figure 21:
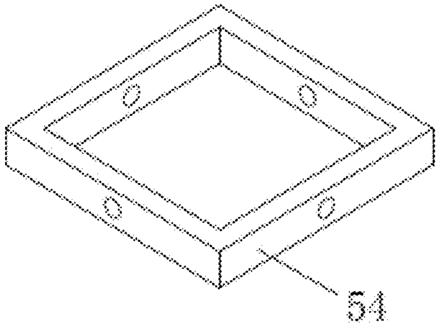
FIG. 21 is a three dimensional diagram of a massage base of the massage bead according to a preferred embodiment of Embodiment 4 of the invention.
Figure 22:
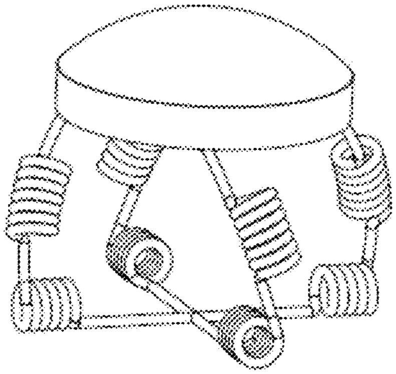
FIG. 22 is a diagram of the massage bead according to Embodiment 4 of the invention.

With reference to FIGS. 21 to 22, in the embodiment, here, the massage seat 54 is located below the massage structure and smaller than the massage structure; the outer side of the massage seat is provided with a mounting hole or the earring hole 93 (edges of the mounting hole and the earring hole are still provided with the arc), and the end of the upper extension twisting arm is inserted, snapped, welded, or connected with the earring hole 93 in any combination with the mounting hole.

In the embodiment, for other structures of the massage bead, reference can be made to the description in Embodiment 1, which is not limited here.

In another special case of the embodiment, the massage seat and the massage structure is arranged to be integrally formed (i.e., the massage body), the mounting hole or the earring hole 93 (edges of the mounting hole and the earring hole are still provided with the arc) is distributed uniformly on the inner side or the outer side of the peripheral direction of the massage body, and the end of the upper extension twisting arm is inserted, welded, or connected with the earring hole 93 in any combination with the mounting hole.

In the embodiment, for other structures of the massage bead, reference can be made to the description in Embodiment 1, which is not limited here.

Embodiment 5

Figure 23:
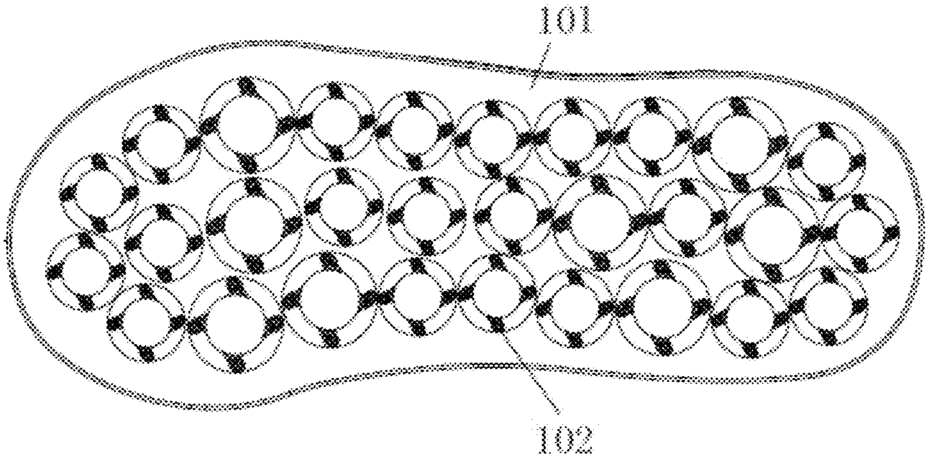
FIG. 23 is a top diagram of a sole according to Embodiment 5 of the invention.

With reference to FIG. 23, the embodiment provides a pair of shoes, which includes the massage bead 102 according to Embodiment 1 or Embodiment 2. Specifically, the massage bead 102 may be arranged inside the insole.

When the massage bead is arranged inside the insole, the insole is provided with a plurality of massage beads 102 according to the above embodiments. In the embodiment, the insole is treated as a carrier, the insole is provided with a plurality of holes (or grooves) to receive the massage bead 102, and the insole may be directly placed in the shoe as an independent body and may also be replaced. The position of the massage bead 102 may be configured according to the needs of the acupoints on the foot soles, and the quantity and size of the massage bead 102 may be configured according to actual needs. Similarly, the rotation angle and the moving distance under pressure for the massage bead 102 itself may be adjusted as required. Those skilled in the art can freely set the number of massage bead 102 and the specific size and material of each part structure according to the different massage needs of the insole or cushion with massage function when facing different users, which are all included in the scope of the embodiment.

Figure 24:
FIG. 24 is a side diagram of a sole according to Embodiment 5 of the invention.
Figure 25:
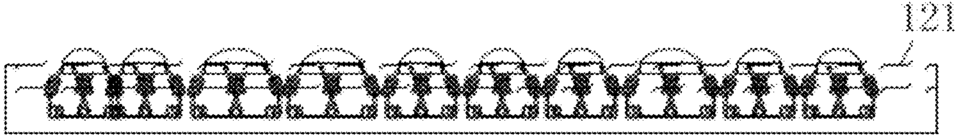
FIG. 25 is a side diagram of a sole attached with an insole according to another preferred embodiment of Embodiment 5 of the invention.

When the massage bead 102 is arranged in the sole 101, the sole 101 of the embodiment receives and compresses the ETSA through the trapezoidal slot 53, and further fixes the twisting spring and the extension arm at the bottom of the massage bead 102, wherein the trapezoidal slot 53 may be arranged on the sole, with a size slightly smaller than the bottom of the massage bead 102, the twisting spring and the extension arm at the bottom; the massage bead 102 may also be fixed in the base 52 by fixing means, glue, etc., preferably without affecting the twisting effect of the massage bead. With reference to FIG. 24, the depth of the trapezoidal slot 53 is configured to be the same as or close to the height of the twisting spring in the massage bead 102 structure. When the massage bead 102 is stressed, in addition to being able to rotate on the horizontal plane where the sole 101 is located, the massage bead may also move up and down relatively substantially in the vertical direction of the sole 101, with a maximum amplitude reaching the vertical distance between the lower plane of the massage seat 22 and the bottom extension arm of the twisting spring. The sole may be covered with an insole (all kinds of material layers 121) at the same position as the massage bead on the sole; with reference to FIG. 25, each massage bead is properly covered, and only the massage structure 21 is exposed. This way, by using the shoe with the massage function, an aesthetically pleasing, safe, and large-angle massage experience may be realized, and the massage effect on the foot sole is better.

Preferably, the insole where the massage bead is placed may be made of wood, medicinal material, pure material, composite or synthetic material, and the insole made of sandalwood also has the effects of reducing swelling, relieving pain, and regulating Qi and blood. The thirty-fourth volume of the main part of Li Shizhen's "Compendium of Materia Medica" said: Red sandalwood tastes salty, slightly cold, non-toxic, and can harmonize nutrient Qi to reduce swelling and poison. *Pterocarpus santalinus* can stop bleeding, relieve pain, and regulate Qi and blood." The insole made of any combination of the above materials is included within the scope of the embodiment.

Embodiment 6

The embodiment provides a cushion, which includes the massage bead 102 according to Embodiment 1 or Embodiment 2. The cushion is provided with a plurality of massage beads 102 according to the above embodiments. The cushion serves as a carrier, and the cushion is provided with a plurality of holes to receive the massage bead 102.

The cushion may be a yoga cushion, a seat cushion, a foot cushion, etc., and may also be laid flat on the ground, so that people can directly step on their feet for massage during leisure. The material of the cushion itself may be selected freely according to its application field. The hole provided on the cushion may cooperate with the necessary fixing device to make the twisting spring at the bottom of the massage bead 102 relatively fixed to the cushion without affecting the twisting of the twisting spring. The fixing device here may be configured as required to be connected with the cushion by inserting, mortise and tenon, buckle, glue or fastening device, and may also be integrated with the cushion. The position of the massage bead 102 may be configured according to the different positions required for the cushion, and the number of the massage bead 102 may be configured according to the massage effect as required. Similarly, the rotation angle and the moving distance under pressure for the massage bead 102 itself may be adjusted as required. Those skilled in the art can freely set the number, the size of massage bead 102, and the specific size and material of each part structure according to the different massage needs of the cushion with massage function when facing different users, which are all included in the scope of the embodiment.

In actual use, the positions of the massage bead may be placed arbitrarily. The outer diameter, the shape of the top and radian of the massage structure, the outer diameter of the massage seat, and the length and height of the ETSA may be adjusted arbitrarily, so that the size of the massage bead may be adjusted arbitrarily. For example, the outer diameter of the massage structure is smaller than, equal to, or larger than the outer diameter of the massage seat, or the outer diameter of the massage seat is less than or equal to the length of two sets of ETSAs that are integrally formed, or the outer diameter of the massage structure is less than or equal to the length of two sets of ETSAs that are integrally formed.

The implementations of the present invention are described in detail above with reference to the accompanying drawings, but the present invention is not limited to the above implementations. Even if various changes are made to the present invention, if these changes fall within the scope of the claims of the present invention and equivalent technologies, they still fall within the protection scope of the present invention.

What is claimed is:

1. A massage bead, comprising a massage body, below which at least two sets of extension twisting spring assemblies (ETSAs) are arranged, wherein the massage body is mounted on an external supporting member through the ETSAs;

each set of the ETSAs comprises a twisting spring and an extension spring; each ETSA is located below the massage body and mounted on the external supporting member through the twisting spring, an upper extension twisting arm of the extension spring is connected with the massage body, and a lower extension twisting arm of the extension spring is connected with an upper end of the twisting spring; the upper extension twisting arm, the extension spring and the lower extension twisting arm connected with each other are arranged axially and in a tilted manner and in a clockwise direction or in a counterclockwise direction simultaneously relative to the massage body; and when the massage body is under pressure, each ETSA is compressed and twisted to generate a rotational pushing force together for pushing the massage body to rotate in the clockwise direction or in the counterclockwise direction, and deformation energy is stored when each ETSA is compressed and twisted so that the massage body resets automatically when energy is released.

2. The massage bead according to claim 1, wherein two sets or more than two sets of the ETSAs are arranged uniformly in a circumferential direction around a center of the massage body or arranged below the massage body.

3. The massage bead according to claim 1, wherein the twisting springs are arranged below the massage body in a combined manner along a radial direction of the massage body; and the upper end of the twisting spring is connected with the extension spring, and a lower end of the twisting spring is further provided with an extension arm, each of the extension arms of the twisting springs of the ETSAs being connected with each other.

4. The massage bead according to claim 1, wherein the massage body comprises a massage base and a massage structure, and the massage base and the massage structure are two independent structures or the massage base is integrated with the massage structure.

5. The massage bead according to claim 4, wherein the massage structure is arranged on an upper end surface of the massage base, and each upper extension twisting arm is connected to inner sides of the massage body, outer sides of the massage body, or/and to the inner sides and the outer sides of the massage base; and each upper extension twisting arm is fixedly connected or/and non-fixedly connected with the massage body or the massage base.

6. The massage bead according to claim 4, wherein a shape of an end surface of the massage structure opposite to the massage base is a hemisphere, a semi-ellipse, a polyhedron, a figure, a symbol, a character, a letter or other preset shapes, or one or/and any combinations thereof.

7. The massage bead according to claim 4, wherein materials of the massage structure and the massage base are stone, wood, medicinal material, pure material, composite, or synthetic material, and any combinations thereof.

8. The massage bead according to claim 1, wherein a receiving portion corresponding to each of the ETSAs and the massage body is arranged on the external supporting member, so that after the massage body is rotated and pressed downward under a force, the massage bead is placed in the receiving portion or placed above the receiving portion and the twisting spring.

9. A pair of shoes or a cushion, comprising the massage bead according to claim 1.

* * * * *